United States Patent
Hsu et al.

(10) Patent No.: US 7,005,905 B2
(45) Date of Patent: Feb. 28, 2006

(54) STABLE TIMING CLOCK CIRCUIT

(75) Inventors: Chi-Ho Hsu, Hsinchu (TW); Chi-Bing Chen, Hsinchu (TW); Hsan-Fong Lin, Hsinchu (TW); Chia-Lu Hsu, Taipei (TW)

(73) Assignee: Holtek Semiconductor Inc., Hsinchu (TW)

( * ) Notice: Subject to any disclaimer, the term of this patent is extended or adjusted under 35 U.S.C. 154(b) by 0 days.

(21) Appl. No.: 10/781,877

(22) Filed: Feb. 20, 2004

(65) Prior Publication Data

US 2005/0057293 A1   Mar. 17, 2005

(30) Foreign Application Priority Data

Sep. 12, 2003   (TW) ............................. 92125133 A

(51) Int. Cl.
*H03K 3/00* (2006.01)
(52) U.S. Cl. ...................... 327/291; 327/298
(58) Field of Classification Search ............... 327/281, 327/285, 291, 298; 363/62, 97; 323/267, 323/285
See application file for complete search history.

(56) References Cited

U.S. PATENT DOCUMENTS

| | | | | |
|---|---|---|---|---|
| 4,428,040 A | * | 1/1984 | Yamashiro et al. | 363/62 |
| 6,044,003 A | * | 3/2000 | Toshinari et al. | 363/97 |
| 6,646,426 B1 | * | 11/2003 | Terashi | 323/285 |

* cited by examiner

*Primary Examiner*—Linh My Nguyen
(74) *Attorney, Agent, or Firm*—Troxell Law Office, PLLC

(57) ABSTRACT

A circuit capable of providing stable timing clock includes: a step-down clamping circuit, an oscillating circuit, and a voltage potential-conversing circuit. The step-down clamping circuit that step down the input first voltage potential, and clamp to output second voltage, the oscillating circuit is coupled to the clamping circuit and is an oscillating circuit that takes the second voltage as a operating voltage to generate a first timing clock signal, which has a lower voltage potential. The voltage potential-conversing circuit is coupled to the oscillating circuit to convert the first timing clock signal into a second timing clock signal, which has a higher voltage potential. And it is a stable timing clock signal available for other system circuit.

13 Claims, 5 Drawing Sheets

STABLE TIMING CLOCK CIRCUIT

FIELD OF THE INVENTION

The invention is to provide a circuit capable of providing stable timing clock, and in particular, to a circuit, capable of providing stable timing clock, adaptable for a radio frequency identification system (RFID).

BACKGROUND OF THE INVENTION

Please refer to FIG. 1 and FIG. 2, which show a passive radio frequency identification system (RFID) of prior arts, that having an inducing side tag 11 and a reading side reader 12. Each side have an inductance is adapted for proceeding the electromagnetic inter-inducing effect and the transmitting behavior of energy and information. The reading side reader 12 of the RFID system may provide sufficient space and cost to arrange a stable DC power source, that to make the reading side reader 12 emit stable high frequency resonance carrier wave and also have demodulating function. The inducing side tag 11 due to the limitation of available area and weight, let the inducing side tag 11 is unable to provide direct and stable DC voltage source for actuation, but a stable system timing clock signal indeed needs a stable DC voltage source to act as a operating voltage.

In tradition, an antenna 21 (exactly is an inductance) at the inducing side tag 11 of a passive RFID is applied as the power source. The antenna of inducing form may be induced the constant radio frequency resonance signal that emitted from the resonance circuit of the reading side reader 12. The radio frequency is to be acted as the source of AC/DC rectifier at the inducing side tag 11 of a passive RFID. Through a full-wave or half-wave rectifier 22 comprised by four or two diodes, a DC power conversion is made. Again, through a simple RC low-pass filter 23, a DC voltage source V1 of approximately stable state is taken out to be act as the operating voltage source for actuating the oscillating circuit 25 and the all circuits at the inducing side tag 11 (please refer to FIG. 4). According to the supplied DC voltage source V1, the oscillating circuit 25 at the inducing side tag 11 oscillates a timing clock signal. Through a simple data coding generation and modulation circuit, the radio frequency include the modulated data information is sent out via the antenna. At the reading side reader 12, through the process of the detecting circuit and demodulation circuit, the weak carrier wave signal variation will be received and demodulated by the reading side reader 12 to an accurate data information signal. Again, through a micro-control unit (MCU), a preset sound or voice may be sent out to accomplish a signal-transmitting objective.

In the prior RFID system, the inducing side tag 11 itself is applied in a suspending state and is not grounded. Limited by the considering factors of the space and cost of the inducing side tag 11, the RC-filtering circuit 23 is unable to provide sufficient filtering effect, the high frequency ripple waveform is generated on the DC bias voltage. It directly influenced the stability of the system timing clock.

In a common prior RFID system, both of the inducing side tag 11 and the reading side reader 12 are not applied at a fixed distance. And, the operating voltage of the inducing side tag 11 is applies the parallel inductance of the inducing side tag 11 and the reading side reader 12 to generate an inducing voltage V1 as shown in FIG. 6, The magnitude of the inducing voltage V1 will be influenced by the distance between the inducing side tag 11 and the reading side reader 12. Due to the inter-induction effect, when both are closer, the inducing voltage V1 will become larger. Vice versa, when both are farther, the inducing voltage V1 will become smaller. When the inducing side tag 11 is moved toward the reading side reader 12, the inducing voltage V1 is raised. However, when the inducing side tag 11 is moved away the reading side reader 12, the inducing voltage V1 will be lowered down. Because the inducing voltage V1 is taken as the operating voltage of the oscillating circuit 25, the variation of the inducing voltage V1 will influence the timing clock signal oscillated by the oscillating circuit 25.

In addition, in the circuit of common inducing side tag 11, there will be a voltage limiter 24 to prevent the circuit from damaging because the inducing voltage is too large to exceed the physical enduring ability of the semiconductor elements when the inducing side tag 11 is too close to the reading side reader 12.

IN the integration circuit process, some feature is limit by the semiconductor process parameter and basic element architecture. For example, the high frequency noise through the IC's common substrate is to penetrate and to influence the entire system's operation. Therefore, the originally stable timing clock signal to any unexpected state, and to cause the whole system function fail.

SUMMARY OF THE INVENTION

The main objective of the invention is to provide a circuit capable of providing stable timing clock, that is adapted for a radio frequency identification system (RFID), is capable of solving the interfering problem of the system's timing clock.

To achieve aforesaid objective, a circuit capable of providing stable timing clock, according to the invention, includes: a step-down clamping circuit, an oscillating circuit, and a voltage potential-conversing circuit. The step-down clamping circuit that has an input side to input first voltage and an output side to output second voltage. The first voltage passing step down and clamp to output second voltage. So, the second voltage potential will higher than the first voltage potential voltage. The oscillating circuit is coupled to the step-down clamping circuit that takes the second voltage as operating voltage to generate the first timing clock signal, which has a lower voltage potential. The voltage potential-conversing circuit that provide differential voltage potential conversation is coupled to the oscillating circuit and to convert the first timing clock signal into a second timing clock signal, which has a higher voltage potential.

Following drawings are cooperated to describe the detailed structure and its connective relationship according to the invention for facilitating your esteemed members of reviewing committee in understanding the characteristics and the objectives of the invention.

DETAILED DESCRIPTION OF THE INVENTION

For your esteemed members of reviewing committee to further understand and recognize the fulfilled functions and structural characteristics of the invention, several preferable embodiments cooperating with detailed description are presented as the follows.

Figure 1:
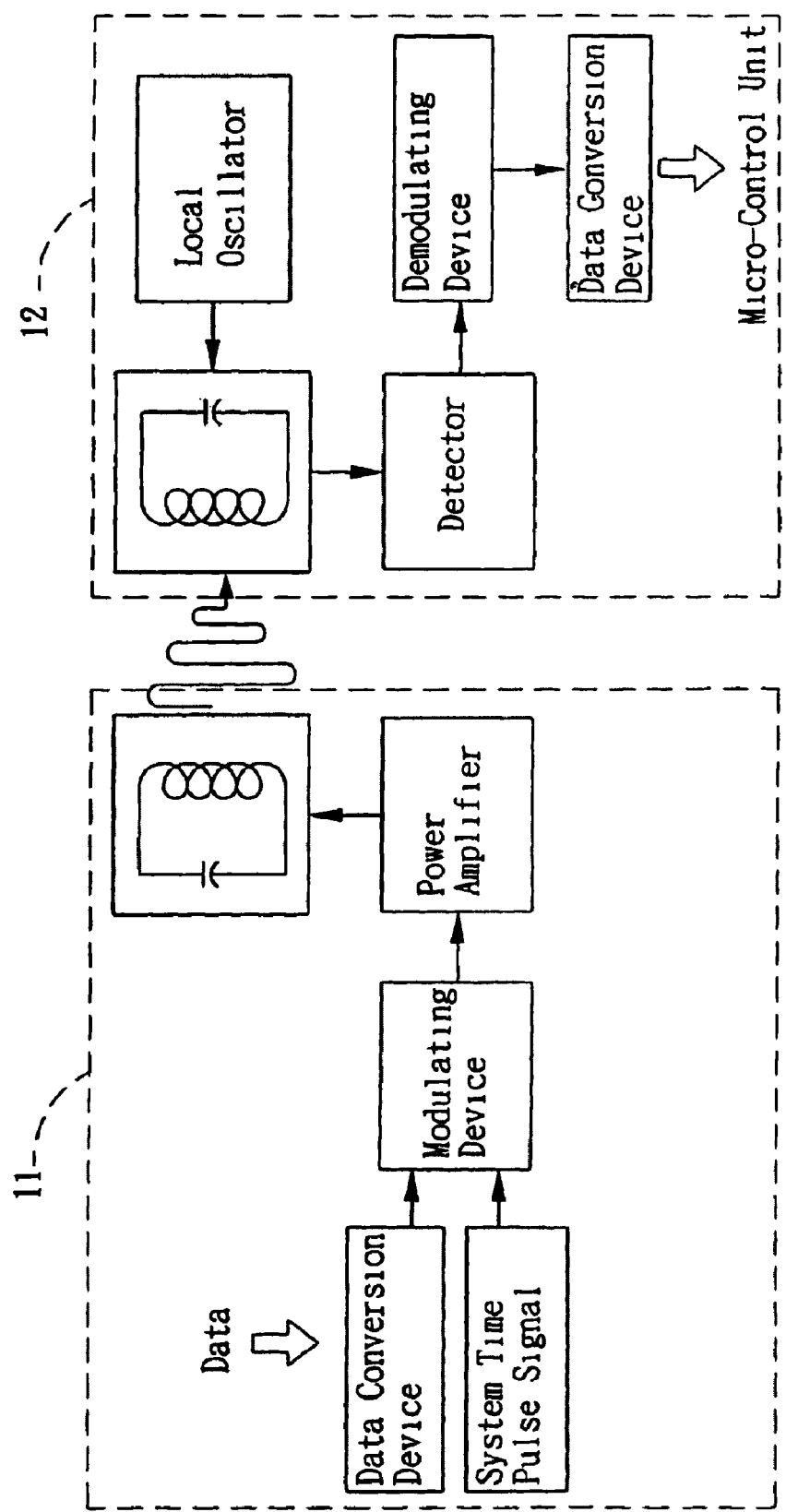
FIG. 1 is a radio frequency identification system (RFID) according to prior arts.
Figure 2:
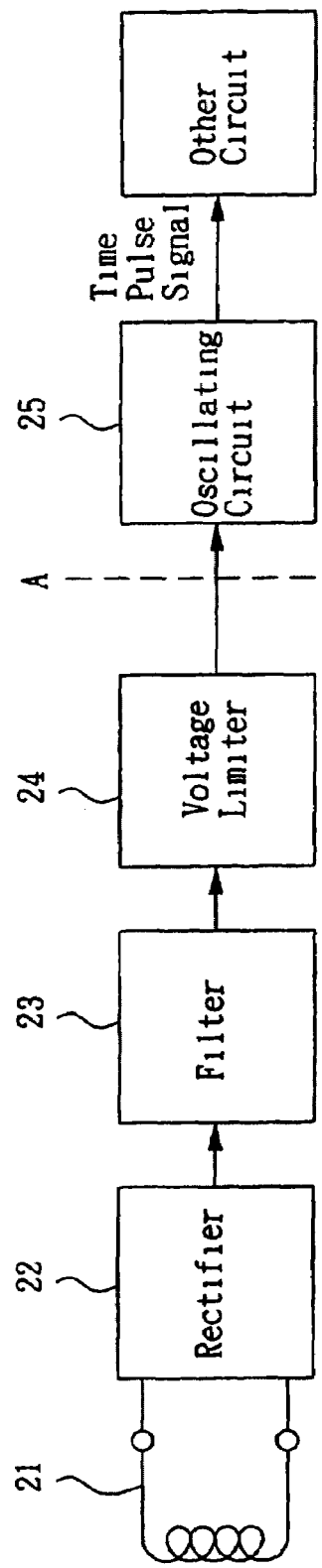
FIG. 2 is an illustration for the operating voltage source of the oscillating circuit of the inducing side tag according to prior arts.

A circuit capable of providing stable timing clock step, according to the invention, is characterized in that a step-down clamping circuit is adapted for generating a stable and low voltage potential voltage, provide as the oscillation circuit operating voltage to oscillate a stable timing clock signal. Again, through a voltage potential-conversing circuit, raising the timing clock voltage potential, to drive whole system operating. Because the oscillation circuit's operating voltage source is different with other system circuit, so, the Noise caused by the variation of the operating voltage in the wireless system according to the prior arts will be immunized. Please refer to FIG. 3, which is a preferable embodiment for the circuit framework, capable of providing stable timing clock step, according to the invention. The circuit framework includes: a rectifier 31, a filter 32, a voltage limiter 33, a step-down clamping circuit 34, an oscillating circuit 35, and a voltage potential-conversing circuit 36. Although FIG. 3 just illustrates the operating voltage source and the oscillating circuit 35 in the inducing side tag, the invention may be applied in the radio frequency identification (RFID) system. The relative other elements and the actuating principles are as described in FIG. 1, so a repetitious description is not presented herein.

Wherein, the rectifier 31 and filter 32 may convert the AC voltage induced by an antenna 30 into a DC voltage. The voltage limiter 33 may prevent the induced voltage from exceeding the physical pressure endurance of a semiconductor element. The step-down clamping circuit 34 that has an input side to input first voltage and an output side to output second voltage. The first voltage passing step down and clamp to output second voltage is coupled to the voltage limiter 33. The oscillating circuit 35 is coupled to the clamping circuit 34 and takes the second voltage as a operating voltage of the oscillating circuit 35 to further generate a first timing clock signal, which has a lower voltage potential. The potential-conversing circuit 36 is coupled to the oscillating circuit 35 to be able to convert the first timing clock into a second timing clock, which has a higher voltage potential.

Figure 3:
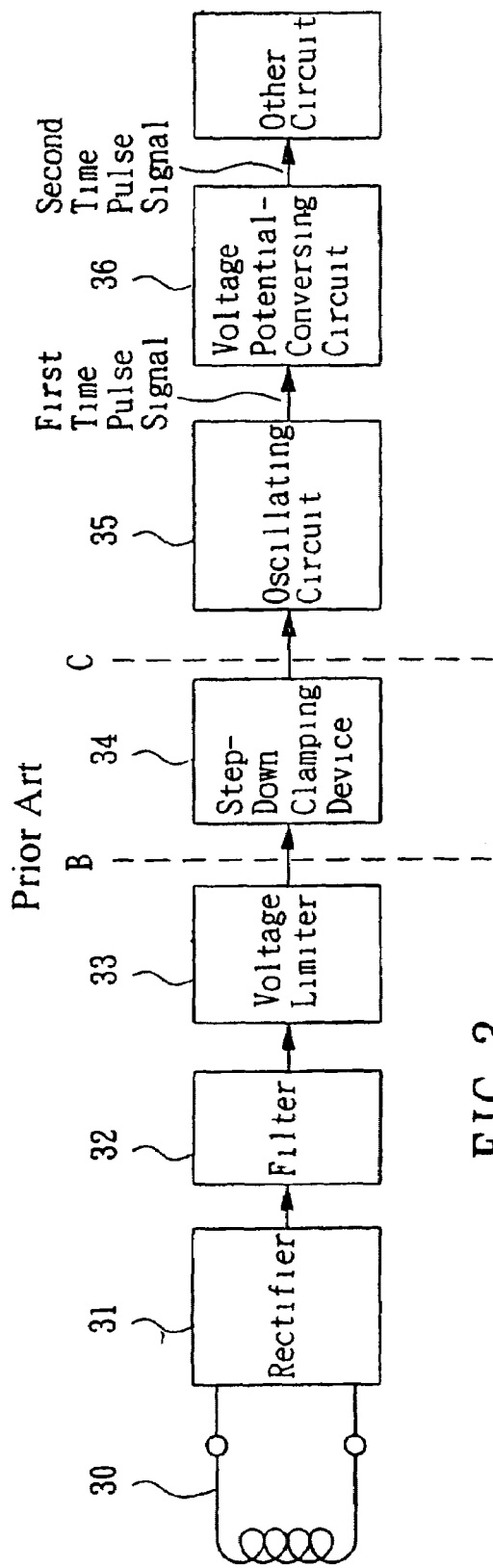
FIG. 3 is a preferable embodiment for the circuit framework, capable of providing stable timing clock, according to the invention.
Figure 4:
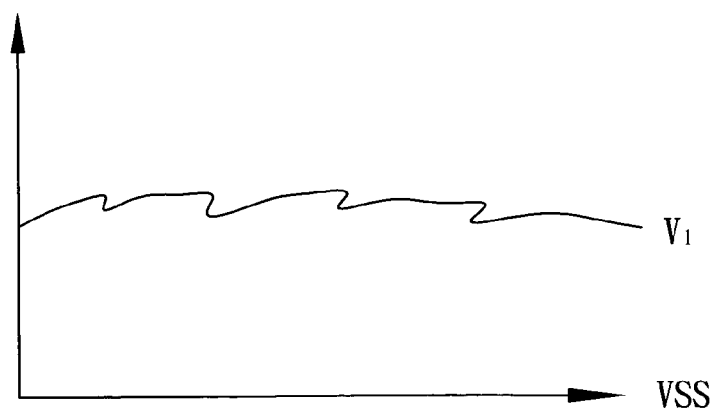
FIG. 4 is a voltage illustration for the 'A' part in FIG. 2.
Figure 5:
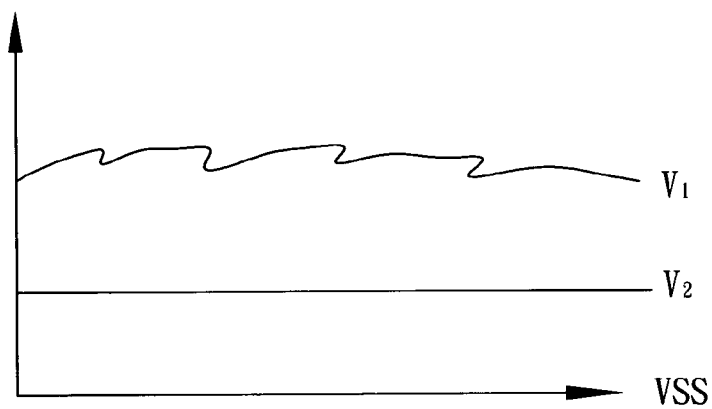
FIG. 5 is a voltage illustration for the 'B' part and 'C' part in FIG. 3.
Figure 6:
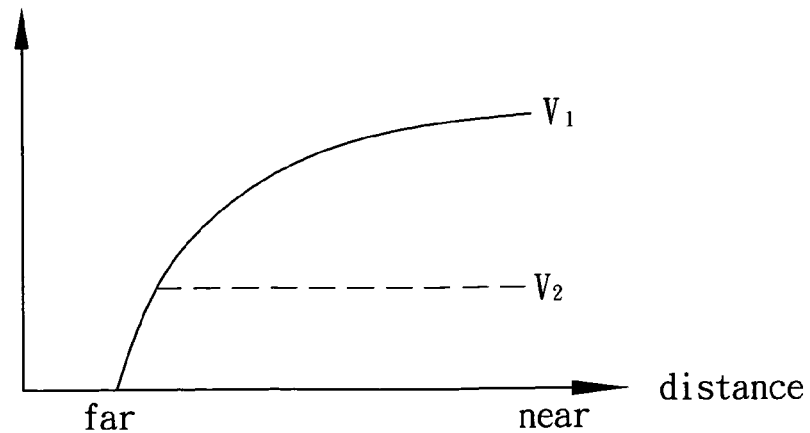
FIG. 6 is a diagram of relationship between the distance between the inducing side tag and the reading side reader and the first voltage and the second voltage.

The aforesaid circuit framework first applies the rectifier 31, filter 32, and voltage limiter 33 to convert the AC voltage induced by the antenna 30 into the first voltage V1, as shown in part 'B' of FIG. 3. The voltage of part 'B' is same as the voltage V1 shown in FIG. 4. However, this first voltage V1 is not an ideal DC voltage source and is not suitable to be an ideal operating voltage for the oscillating circuit 35, so a step-down clamping circuit 34 is applied to lower down the voltage potential of the first voltage V1 to generate a stable second voltage V2 as shown in part 'C' of FIG. 3. The voltage of part 'C' is same as the voltage V2 shown in FIG. 5. The voltage potential of the second voltage V2 must be able to drive the oscillating circuit 35. Now, the second voltage V2 is approached to an ideal DC voltage that may be taken as a operating voltage of the oscillating circuit 35 (please refer to FIG. 6, where the second voltage V2 will not be influenced by the distance between the sensing side tag 11 and the reading side reader 12) to make the oscillating circuit 35 oscillate a stable timing clock signal, which has a lower voltage potential that is not suitable to actuate the other circuit in the inducing side tag 11. So, a voltage potential-converting circuit 36 is applied to raise the voltage potential of the first timing clock signal to a second timing clock signal of higher voltage potential. This second timing clock signal has a higher voltage potential and is a stable timing clock signal available for other circuit.

In the aforesaid circuit framework, the oscillating circuit 35 is not influenced by the first voltage V1 after the filter and is clamped at a lower bias voltage, such that the oscillating circuit 35 will not vary the first voltage V1 to influence the timing clock signal due to the different distances. In addition, the filter 32 may also reduce the requirement for filtering the rippling wave. This arrangement may effectively lower down the requiring cost and space for the inducing side tag 11.

Figure 7:
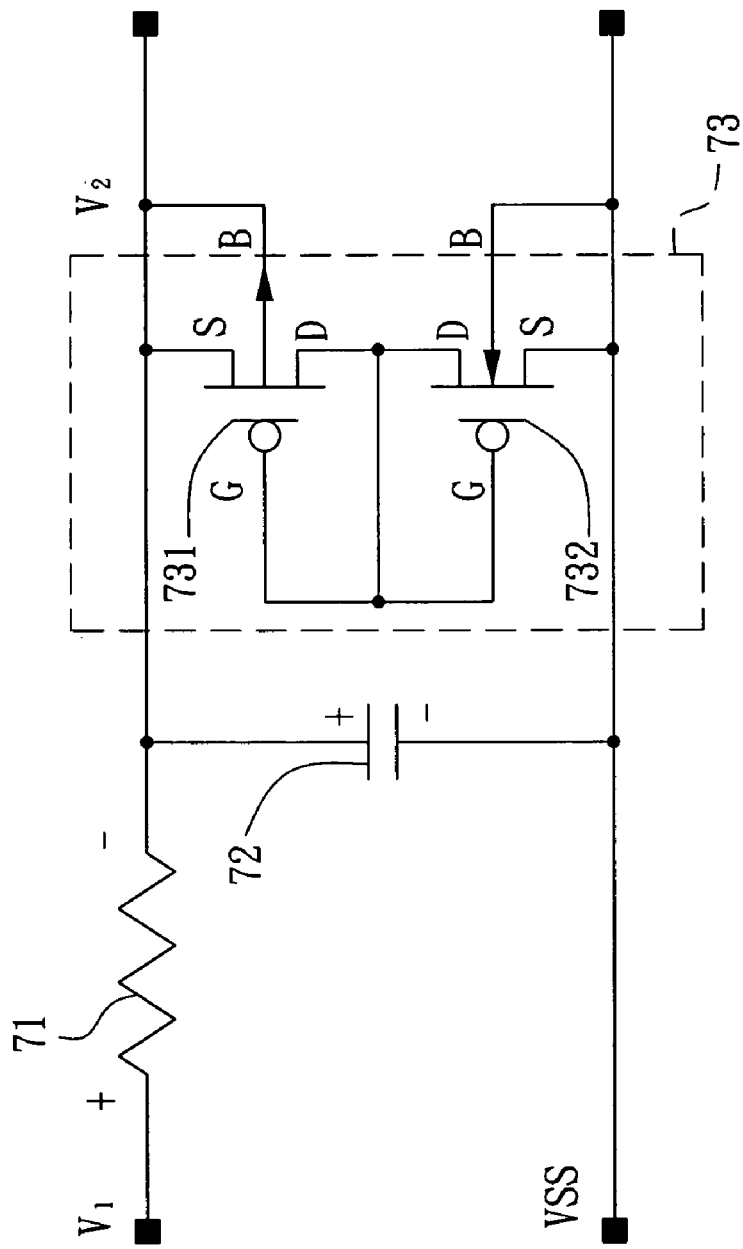
FIG. 7 is a preferable embodiment for the step-down clamping circuit.

Please refer to FIG. 7, which is a preferable embodiment for the step-down clamping circuit 34. This step-down clamping circuit 34 is comprised of a resistance 71, a capacitance 72, and a clamping circuit 73. Wherein, the clamping circuit 73 is comprised of a P-type metal oxide semiconductor (PMOS) 731 and an N-type metal oxide semiconductor (NMOS) 732.

Figure 8:
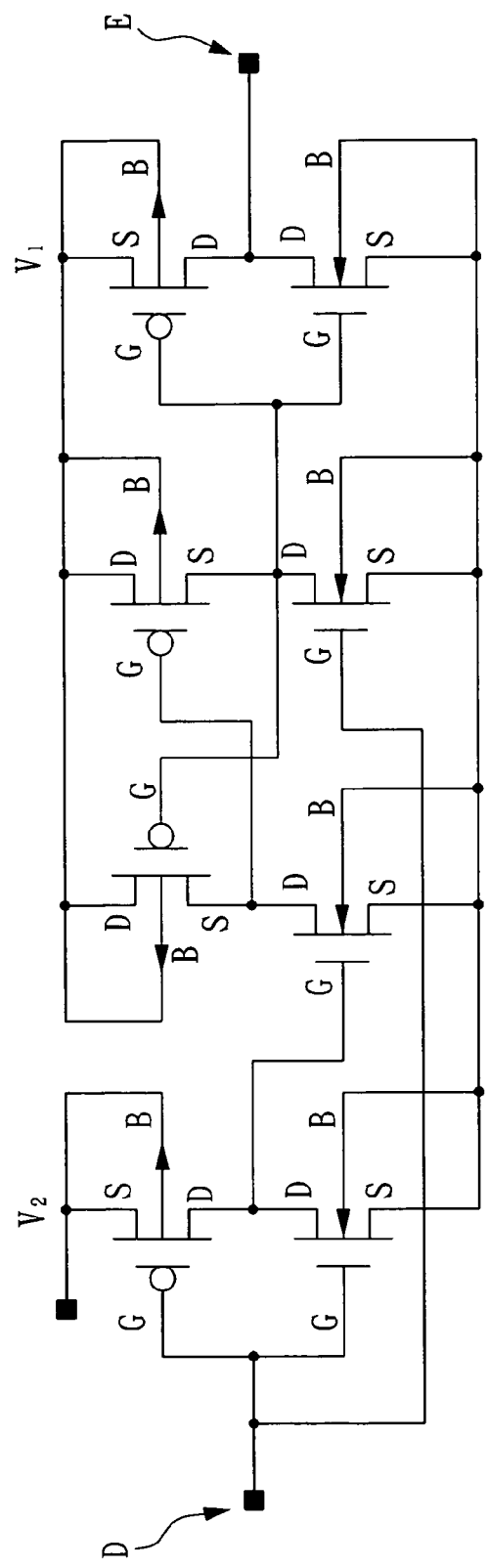
FIG. 8 is a preferable embodiment for the voltage potential-conversing circuit.

Please refer to FIG. 8, which is a preferable embodiment for the voltage-converting circuit 36. The first timing clock signal (having a lower voltage potential) is input from the D side, and the second timing clock (having a higher voltage potential) is output from the E side.

However, the aforementioned description is only the preferable embodiments according to the invention of course, that can not be applied as a limitation to the field of the invention, and any equivalent variation and modification made according to the claims claimed thereinafter still possess the merits of the invention and are still within the spirits and the ranges of the invention, so they should be deemed as a further executing situation of the invention.

What is claimed is:

1. A circuit providing a stable timing clock comprising:
   a) an antenna inducing an AC voltage;
   b) an AC/DC rectifier electrically connected to the antenna;
   c) a filter electrically connected to the AC/DC rectifier;
   d) a voltage limiter electrically connected to the filter, the AC/DC rectifier, the filter and the voltage limiter converting the AC voltage into a first DC voltage;
   e) a step-down clamping circuit electrically connected to the voltage limiter and converting the first DC voltage into a second DC voltage;
   f) an oscillating circuit electrically connected to the step-down clamping circuit and utilizing the second DC voltage as an operating voltage, the oscillating circuit generating a first timing clock signal having a voltage potential lower than a voltage potential of the second DC voltage; and
   g) a voltage potential-converting circuit electrically connected to the oscillating circuit and converting the first timing clock signal into a second timing clock signal having a voltage potential higher than a voltage potential of the first timing clock signal, wherein the second timing clock signal is produced from the AC voltage induced by the antenna.

2. The circuit according to claim 1, wherein the first DC voltage having rippling wave and voltage potential having variations larger than the second DC voltage.

3. The circuit according to claim 1, wherein the second DC voltage is a preferred DC voltage.

4. The circuit according to claim 1, wherein the second DC voltage is smaller than the first DC voltage.

5. The circuit according to claim 1, wherein the step-down clamping circuit includes a resistance, a capacitance, and a clamping circuit.

6. The circuit according to claim 5, wherein the clamping circuit includes a P-type metal oxide semiconductor and a N-type metal oxide semiconductor.

7. A circuit providing a stable timing clock comprising:
a) an antenna inducing an AC voltage;
b) a rectifying circuit electrically connected to the antenna and a voltage limiter and converting the AC voltage into a first DC voltage;
c) a step-down clamping circuit electrically connected to the voltage limiter and converting the first DC voltage into a second DC voltage;
d) an oscillating circuit electrically connected to the step-down clamping circuit and utilizing the second DC voltage as an operating voltage and generating a first timing clock signal having a voltage potential lower than a voltage potential of the second DC voltage; and
e) a voltage potential-converting circuit electrically connected to the oscillating circuit and converting the first timing clock signal into a second timing clock signal having a voltage potential higher than a voltage potential of the first timing clock signal,
wherein the second timing clock signal is produced from the AC voltage induced by the antenna.

8. The circuit according to claim 7, wherein the rectifying circuit having a AC/DC rectifier, a filter, and a voltage limiter.

9. The circuit according to claim 7, wherein the first DC voltage having rippling wave and voltage potential having variations larger than the second DC voltage.

10. The circuit according to claim 7, wherein the second DC voltage is a preferred DC voltage.

11. The circuit according to claim 7, wherein the second DC voltage is smaller than the first DC voltage.

12. The circuit according to claim 7, wherein the step-down clamping circuit includes a resistance, a capacitance, and a clamping circuit.

13. The circuit according to claim 12, wherein the clamping circuit includes a P-type metal oxide semiconductor and a N-type metal oxide semiconductor.

* * * * *